(12) United States Patent
Sedivy et al.

(10) Patent No.: US 7,651,057 B2
(45) Date of Patent: Jan. 26, 2010

(54) DEVICE FOR FASTENING AT LEAST ONE OBJECT TO A SUPPORTING PART PROVIDED WITH A FASTENING BOLT

(75) Inventors: Jiri Sedivy, Jablonec nad Nisou (CZ); Sylvain Giraud, Echirolles (FR)

(73) Assignee: A. Raymond et Cie, Grenoble (FR)

( * ) Notice: Subject to any disclaimer, the term of this patent is extended or adjusted under 35 U.S.C. 154(b) by 35 days.

(21) Appl. No.: 11/914,258

(22) PCT Filed: Apr. 27, 2006

(86) PCT No.: PCT/EP2006/003897

§ 371 (c)(1),
(2), (4) Date: Nov. 13, 2007

(87) PCT Pub. No.: WO2006/131174

PCT Pub. Date: Dec. 14, 2006

(65) Prior Publication Data

US 2008/0210830 A1  Sep. 4, 2008

(30) Foreign Application Priority Data

Jun. 10, 2005  (DE) .................. 10 2005 026 855

(51) Int. Cl.
*F16L 3/22* (2006.01)
(52) U.S. Cl. .................. 248/68.1; 411/433; 411/437
(58) Field of Classification Search ............... 248/68.1, 248/73, 74.4, 74.5, 69; 411/433, 437
See application file for complete search history.

(56) References Cited

U.S. PATENT DOCUMENTS

| 5,816,762 | A | * | 10/1998 | Miura et al. ............ 411/433 |
| 5,947,426 | A | | 9/1999 | Kraus |
| 5,947,669 | A | * | 9/1999 | Schaty ............... 411/324 |
| 2003/0010874 | A1 | | 1/2003 | Nakanishi |
| 2004/0144897 | A1 | * | 7/2004 | Maruyama ............ 248/68.1 |
| 2005/0008456 | A1 | | 1/2005 | Birkelbach et al. |

FOREIGN PATENT DOCUMENTS

| DE | 19529897 A1 | 2/1997 |
| DE | 10357540 A1 | 1/2005 |
| EP | 0950845 A2 | 10/1999 |
| WO | WO02097315 A | 12/2002 |

OTHER PUBLICATIONS

Official WIPO translation of the International Preliminary Report on Patentability mailed in related International Application No. PCT/EP2006/003897.

* cited by examiner

*Primary Examiner*—Ramon O Ramirez
(74) *Attorney, Agent, or Firm*—Baker & Daniels LLP

(57) ABSTRACT

A device for fastening at least one object to a supporting part provided with a fastening bolt comprises an engaging arrangement (13) that can be brought into engagement with the fastening bolt. The engaging arrangement (13) is mounted on an inner cage (8) connected via a number of bent flexible connecting pieces (14, 15, 16, 17) to an outer cage (3), on which, in turn, at least one holding arrangement (1, 2) for holding the or each object is formed. This results in good tolerance compensation with regard to the position of the fastening bolt.

7 Claims, 3 Drawing Sheets

US 7,651,057 B2

DEVICE FOR FASTENING AT LEAST ONE OBJECT TO A SUPPORTING PART PROVIDED WITH A FASTENING BOLT

BACKGROUND OF THE INVENTION

A device for fastening an object to a supporting part with a fastening bolt is known, for example, from DE 196 34 309 A1. The prior device comprises an engaging arrangement that can be brought into engagement with the fastening bolt. Said engaging arrangement is surrounded by an outer cage to which is joined a holding arrangement for the objects to be fastened, particularly conduits.

Such a device is also known from U.S. Pat. No. 2003/0010874 A1. The prior device for fastening at least one object to a supporting part provided with a fastening bolt comprises an engaging arrangement that can be brought into engagement with the bolt fastening. There is additionally an outer cage surrounding the engaging arrangement, the engaging arrangement being mounted on an inner cage disposed inside the outer cage. The inner cage is connected to the outer cage via a number of bent flexible connecting pieces located inside the outer cage, which is closed circumferentially in the region of the connecting pieces.

Known from DE 103 57 450 A1 is a device for fastening at least one object to a supporting part which is provided with a fastening bolt, in which the fastening bolt can be inserted into an inner cage through a conical opening. For engagement with the fastening bolt, a spring nut is disposed in the manner of a cover plate in the region of the conical recess.

The object underlying the invention is to provide such a device that affords efficient tolerance compensation with regard to the position of the fastening bolt.

SUMMARY OF THE INVENTION

By virtue of the fact that the connecting pieces of the inventive device are bent outward, the connecting pieces are able to move unhindered away from the outer cage, thus affording efficient tolerance compensation with regard to the position of the fastening bolt.

BRIEF DESCRIPTION OF THE DRAWINGS

Other suitable configurations and advantages will become apparent from the following description of a preferred exemplary embodiment of the invention, taken with reference to the figures of the drawing wherein.

Figure 1:
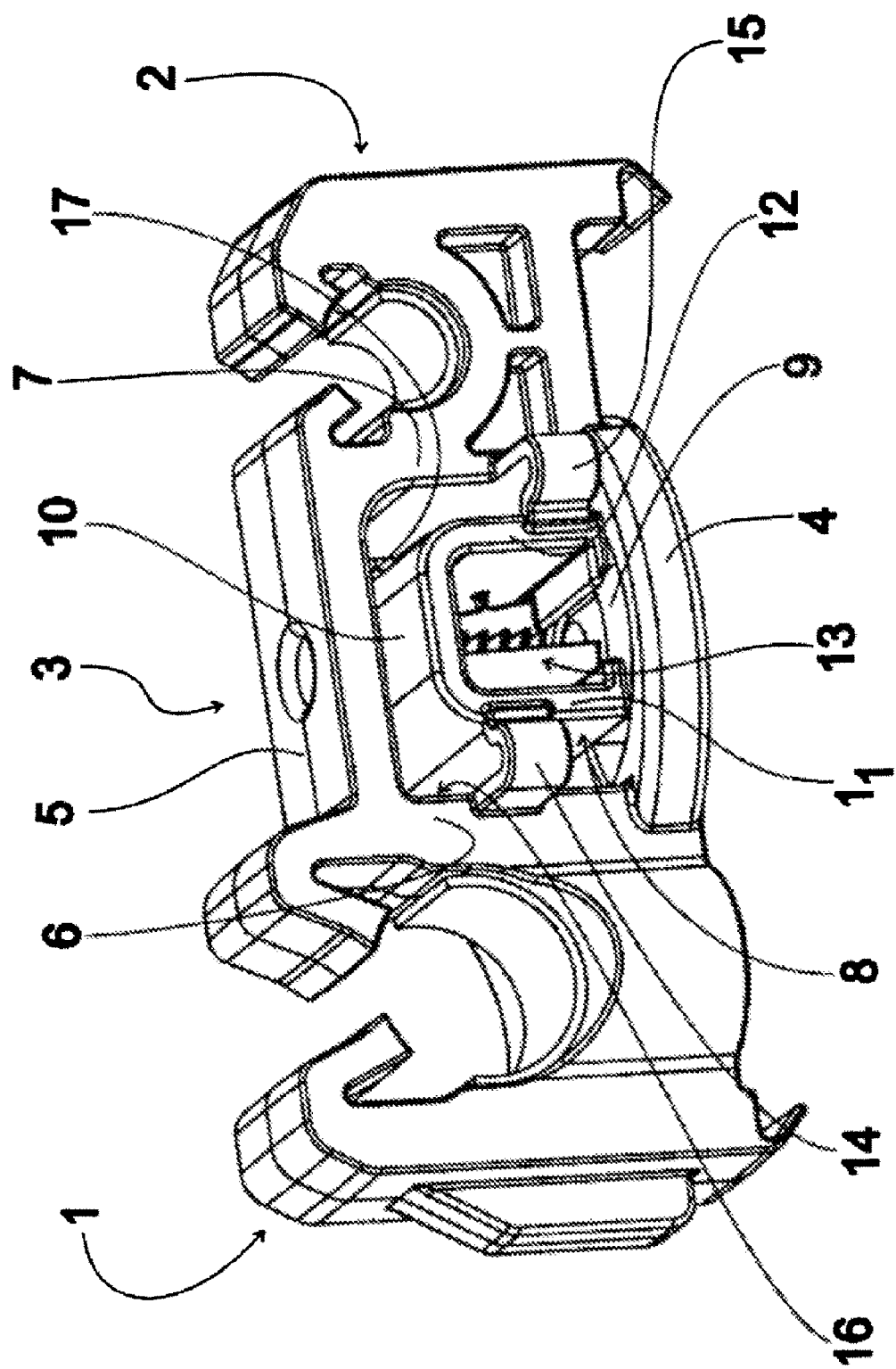
FIG. 1 is a perspective view of an exemplary embodiment of a device according to the invention.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a perspective view of an exemplary embodiment of a device according to the invention, which comprises holding arrangements 1, 2, in which can be fastened to preferably elongate objects, for example conduits in the form of electrical wiring or fluid lines. The holding arrangements 1, 2 are connected to an outer cage 3 comprising an annular base portion 4, a top portion 5 disposed spacedly from said base portion 4, and two side portions 6, 7 interconnecting said base portion 4 and said top portion 5. The device may be made from a foamed synthetic material, such as a PP/EPDM copolymer.

Disposed within outer cage 3 is an inner cage 8, comprising an annular base portion 9, a flattened top portion 10 and two side portions 11, 12 interconnecting said base portion 9 and said top portion 10. Inside the inner cage 8 is an engaging arrangement 13, which can be brought into engagement with a fastening bolt (not illustrated in FIG. 1) that is typically mounted on a supporting part (also not shown in FIG. 1).

The device according to the invention additionally comprises a number of bent flexible connecting pieces 14, 15, 16, 17, it being the case in the illustrated exemplary embodiment that two connecting pieces 14, 15 are disposed on what is the front side in the representation of FIG. 1 and two connecting pieces 16, 17 on what is the back side in the representation of FIG. 1. Thus, the inner cage 8 is mounted movably in spaced relation to the outer cage 3.

Figure 2:
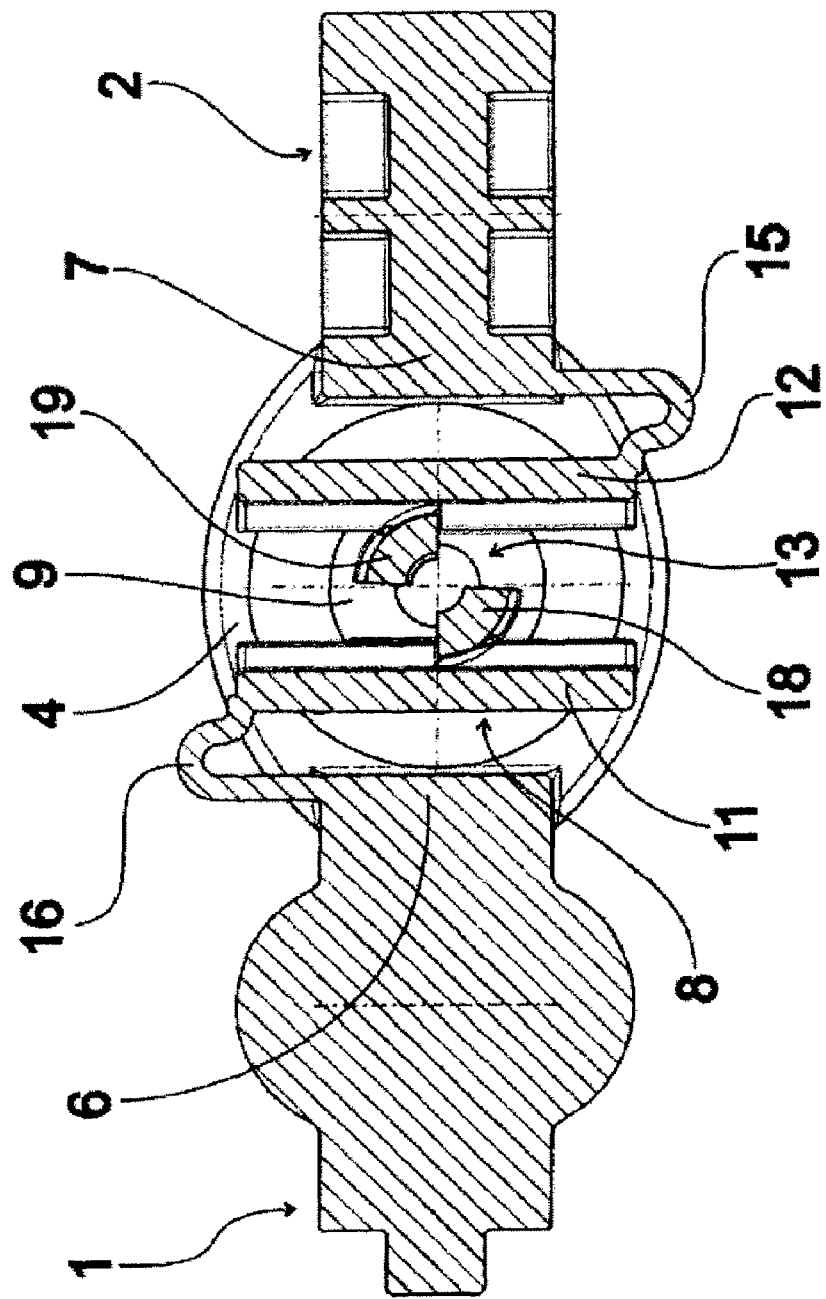
FIG. 2 shows the exemplary embodiment according to FIG. 1 in a section taken at right angles to an insertion direction of a fastening bolt.

FIG. 2 shows the exemplary embodiment according to FIG. 1 in a section taken at right angles to an insertion direction of a fastening bolt, at a level occupied by the connecting pieces 15, 16 disposed adjacent to base portions 4, 9. It can be seen from FIG. 2 that the respectively similarly configured connecting pieces 14, 15, 16, 17 are bent outward, they being arranged in pairs diametrically opposite each other in two mutually offset planes on both sides of the inner cage. This also produces a certain torsionability of the inner cage 8 relative to the outer cage 3 in the longitudinal direction of the fastening bolt.

It can further be understood from FIG. 2 that the engaging arrangement 13 comprises a number—for example two, as in the illustrated exemplary embodiment—of bolt claws 18, 19, which can be brought into engagement with the fastening bolts. The bolt claws 18, 19 are disposed diametrically opposite each other and each extend over a circumferential angle of approximately 90 degrees.

Figure 3:
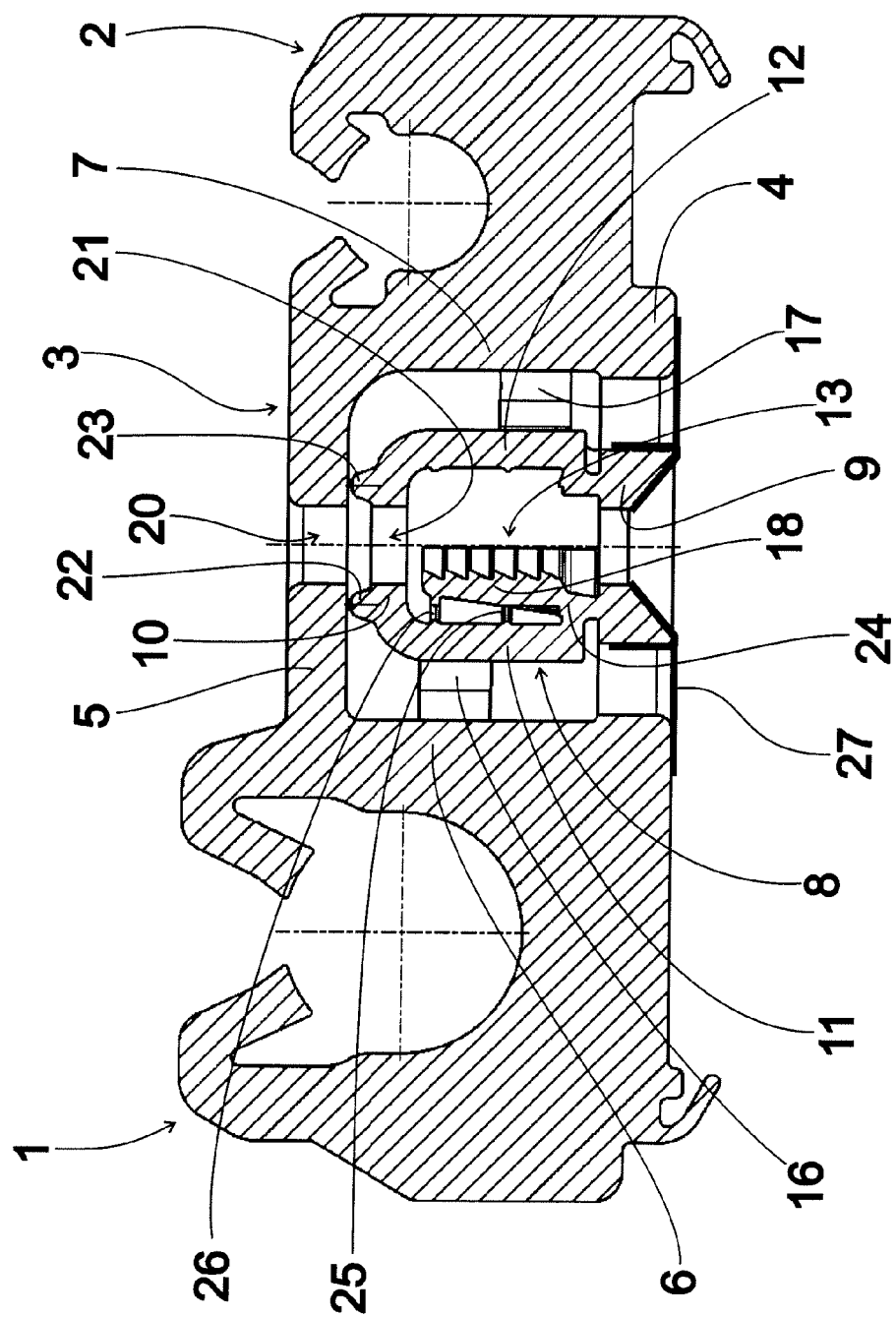
FIG. 3 shows the exemplary embodiment according to FIG. 2 in another section, extending at right angles to the section of FIG. 2.

FIG. 3 shows the exemplary embodiment according to FIG. 1 in a further section, which extends at right angles to the section of FIG. 1. It can be seen from the representation according to FIG. 3 that the connecting pieces 14, 15, 16, 17 are arranged in pairs in two planes. It can further be appreciated from FIG. 3 that a respective recess 20, 21 is provided in each of the top portions 5, 10 of outer cage 3 and inner cage 8, respectively, in order, during the production of the device, to draw the female mold for the bolt claws 18, 19 through the top portions 5, 10 by the action of a mandrel and permit the ejection of the device.

It can further be understood from FIG. 3 that configured on the top portion 10 of inner cage 8 are projections 22, 23 directed toward the top portion 5 of outer cage 3, in order to limit the relative movement of inner cage 8 in relation to outer cage 3 in the insertion direction when the device is pushed onto a fastening bolt.

In the representation according to FIG. 3, it can be seen that the bolt claws 18, 19 are connected to inner cage 8 via a number of connecting ribs 24, 25, 26.

It can additionally be understood from FIG. 3 that the base portion 9 of inner cage 8 is conically beveled on the inside, to produce a guiding effect when the device is pushed onto a fastening bolt. To prevent damage from occurring should the fastening bolt initially be positioned improperly in the clearance between outer cage 3 and inner cage 8, a cover plate 27 is present that is connected to the base portion 9 of inner cage 8 and is floatingly mounted in relation to outer cage 3. The cover plate 27 extends from base portion 9 of inner cage 8 radially outward at least far enough so that the clearance between the base portions 4, 9 is covered even in the event of the maximum possible relative movements of inner portion 8 relative to outer portion 3.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A device for use in fastening an object to a supporting part which includes a fastening bolt, said device comprising:
   an engaging arrangement adapted to be brought into engagement with the fastening bolt;
   an outer cage surrounding said engaging arrangement; and
   an inner cage on which said engaging arrangement is mounted, said inner cage disposed inside said outer cage, said inner cage connected to said outer cage by a plurality of separate, outwardly bent flexible connecting pieces, wherein four said connecting pieces are provided, said connecting pieces arranged in pairs diametrically opposite each other in two mutually offset planes on opposite sides of said inner cage.

2. The device of claim 1 wherein a pair of said connecting pieces located in one of said planes are arranged diagonally opposite each other relative to said inner cage.

3. The device of claim 1 wherein said engaging arrangement comprises a plurality of bolt claws that are adapted to be brought into engagement with the fastening bolt, said bolt claws connected to said inner cage via connecting ribs.

4. The device of claim 1 wherein said inner cage includes a floor portion comprising a recess that tapers conically in an insertion direction of the fastening bolt.

5. The device of claim 4 including a cover plate which is connected to said inner cage and which is floatingly mounted in the insertion direction from said base portion, said cover plate covering a clearance between said outer cage and said inner cage.

6. The device of claim 1 wherein said device is made from a foamed synthetic material.

7. The device of claim 6 wherein said synthetic material is a PP/EPDM copolymer.

* * * * *